UNITED STATES PATENT OFFICE.

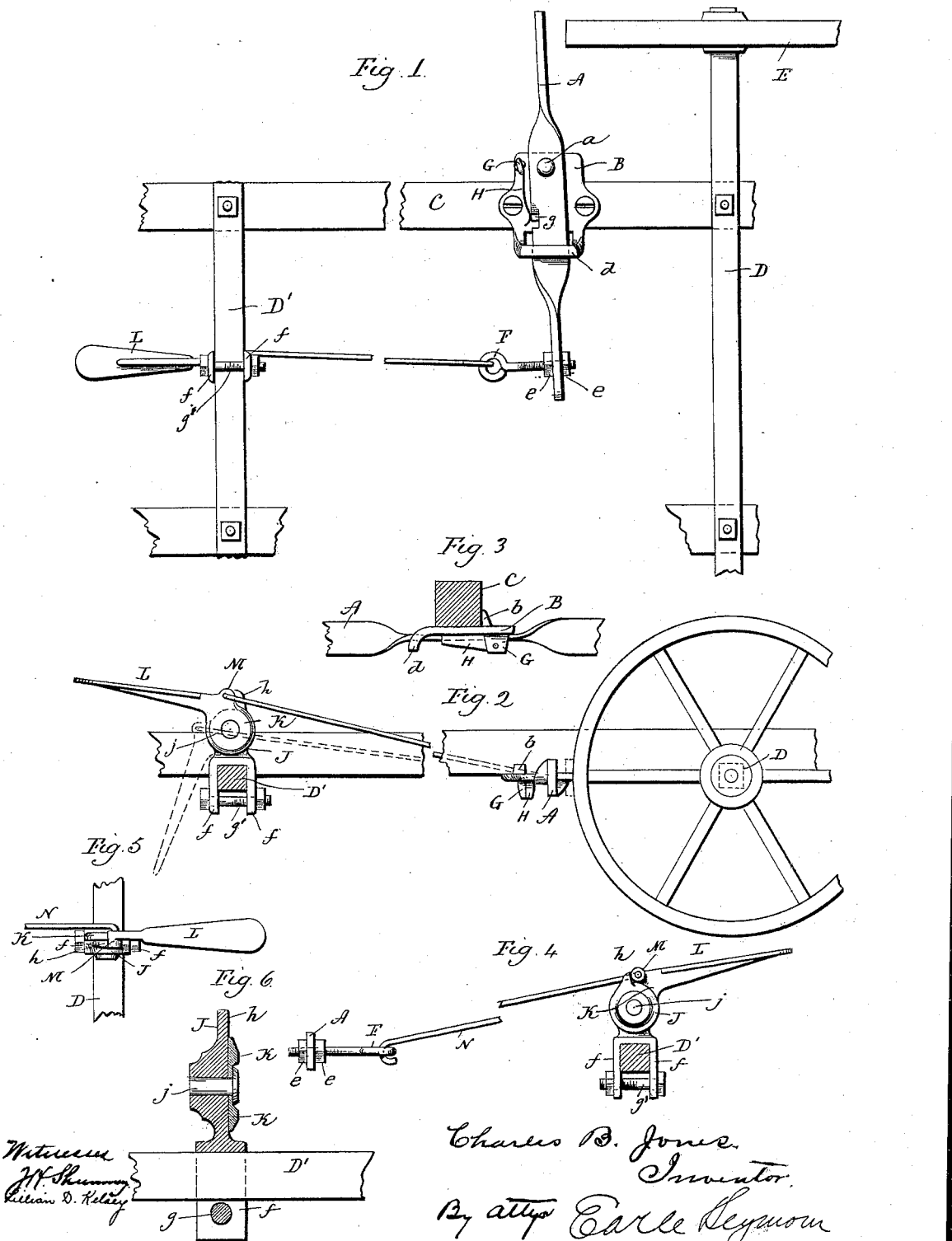

CHARLES B. JONES, OF NEW HAVEN, CONNECTICUT, ASSIGNOR OF ONE-HALF TO FREDERICK L. COWLES, OF SAME PLACE.

VEHICLE-BRAKE.

SPECIFICATION forming part of Letters Patent No. 608,865, dated August 9, 1898.

Application filed April 21, 1898. Serial No. 678,416. (No model.)

*To all whom it may concern:*

Be it known that I, CHARLES B. JONES, of New Haven, in the county of New Haven and State of Connecticut, have invented a new Improvement in Vehicle-Brakes; and I do hereby declare the following, when taken in connection with the accompanying drawings and the letters of reference marked thereon, to be a full, clear, and exact description of the same, and which said drawings constitute part of this specification, and represent, in—

Figure 1, a plan view of the under side of the axles and one handle-bar of the vehicle, showing my improved brake applied thereto; Fig. 2, a broken side view of the same; Fig. 3, a side view of the plate and a portion of the brake-bar; Fig. 4, a side view of the device opposite that illustrated in Fig. 2; Fig. 5, a top view of the operating-lever and plate to which it is attached; Fig. 6, a sectional view through the plate and operating-lever.

This invention relates to an improvement in vehicle-brakes, and particularly such as are applicable for children's carriages, and especially to that particular class in which the brake may be thrown into operation or released by the foot, the object of the invention being a simple construction which will effectually hold one of the wheels against revolution and which may be readily thrown into or out of engagement with the wheel; and it consists in the construction as hereinafter described, and particularly recited in the claims.

As herein shown, the device consists of a brake-bar A, pivoted to a plate B, which is adapted to be secured to the under side of one of the handle-bars or perch C, which is attached to the front axle D and rear axle D', upon which the wheels are mounted, only one front wheel E being shown. The plate B is preferably formed with upwardly-extending lugs b, which take a bearing outside the handle-bar C, so as to assist in locating the plate in proper position. The inner end of the plate is also formed with a bar d in a plane below the plane of the plate and so as to form a bearing beneath the break-bar A. This bar is preferably formed from a strip of sheet metal, the ends of which are turned into a plane at right angle to the plane of the central portion, so as to present a flat surface to the rim of the wheel and for the support of an eye F, which is secured to the inner end of the lever by nuts e. The said plate is also provided with a downwardly-extending lug G, to which a spring H is riveted, which spring bears against the bar A at a point inside the pivot a and so as to normally throw the outer end of the bar away from the wheel E. To form a sufficient bearing for this spring, a finger g is struck up from the edge of the central portion of the bar.

Upon the rear axle D', I mount an upright plate J, which is formed with downwardly-extending legs f, which pass on opposite sides of the rear axle, below which they are connected by a bolt g', whereby the plate is securely clamped to the rear axle D'. This plate is provided at its upper edge with an upwardly-extending lug h, and centrally pivoted to the plate is the short arm K of a lever L, this lever being formed at its inner end with a hub M, to which one end of a link N is attached, the other end extending into engagement with the eye F. The hub M also extends inward, so as to engage with the lug h, which forms a stop, limiting the upward movement of the lever.

In operation the device normally stands with the lever up, in which position the brake-bar is away from the rim of the wheel. When it is desired to apply the brake, the lever L is depressed, which draws the link N rearward, and as this link is attached to the inner end of the bar it follows that this bar is turned and its outer end forced against the rim of the wheel and so as to hold that wheel against revolution. When in the depressed position, the line of draft from the brake-bar to the operating-lever is below the pivot j, upon which the lever is hung, and as the downward movement of the lever is limited by one of the legs f or the axle D' it follows that the brake will be held in the operating position. When it is desired to release the brake, it is only necessary to lift the lever, when the spring secured to the plate operates upon the brake-bar to throw its outer end out of engagement with the rim of the wheel.

I am aware that brake-bars have been mounted on the handle-bars of children's carriages and adapted to be operated through a lever mounted on the rear axle, and therefore do not wish to be understood as claiming, broadly, such as my invention; but, Having fully described my invention, what I claim as new, and desire to secure by Letters Patent, is—

1. The combination with a brake-bar pivotally connected to a plate secured to one of the handle-bars so as to project in line with the rim of one of the wheels, a spring secured to said plate tending to throw the outer end of the bar away from the rim of the wheel, a plate mounted on the rear axle and formed with an upwardly-extending lug, a lever pivoted to said plate and formed with a hub projecting into line with the said lug, and a link secured in said hub and extending into connection with the inner end of said brake-bar, substantially as described.

2. The combination with a brake-bar pivotally secured to a plate, said plate formed at its inner edge with a transverse bar in a plane below the plane of said plate and with a downwardly-extending lug, a spring secured to said lug and bearing against one edge of said bar, a plate adapted to be secured to the rear axle and formed with an upwardly-extending lug, a lever pivotally secured to said plate, and a link connecting said lever with the inner end of the brake-bar, substantially as described.

In testimony whereof I have signed this specification in the presence of two subscribing witnesses.

CHARLES B. JONES.

Witnesses:
THOMAS T. WELLES,
GEO. H. C. TOLMAN.